United States Patent
Wu et al.

(10) Patent No.: US 12,245,240 B2
(45) Date of Patent: Mar. 4, 2025

(54) METHOD FOR TRANSMITTING A TRANSMISSION INDICATION SIGNAL, NETWORK DEVICE, AND TERMINAL

(71) Applicant: VIVO MOBILE COMMUNICATION CO., LTD., Guangdong (CN)

(72) Inventors: Kai Wu, Dongguan (CN); Xueming Pan, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 683 days.

(21) Appl. No.: 17/206,190

(22) Filed: Mar. 19, 2021

(65) Prior Publication Data

US 2021/0212036 A1    Jul. 8, 2021

Related U.S. Application Data

(63) Continuation of application No. PCT/CN2019/101972, filed on Aug. 22, 2019.

(30) Foreign Application Priority Data

Sep. 20, 2018  (CN) .......................... 201811103528.6

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01)

(58) Field of Classification Search
CPC ............. H04W 72/23; H04W 74/0808; H04W 74/006; H04W 16/14; H04W 72/231; H04W 72/232; H04L 5/0048; H04L 5/0053; H04L 5/0057; Y02D 30/70
See application file for complete search history.

(56) References Cited

U.S. PATENT DOCUMENTS

| 10,652,753 | B2 | 5/2020 | Choi et al. |
| 2016/0278074 | A1* | 9/2016 | Yang ..................... H04L 1/1812 |
| 2018/0020479 | A1 | 1/2018 | Harada et al. |
| 2018/0083680 | A1 | 3/2018 | Guo et al. |

(Continued)

FOREIGN PATENT DOCUMENTS

| CN | 101754396 A | 6/2010 |
| CN | 102170644 A | 8/2011 |

(Continued)

OTHER PUBLICATIONS

"5G; NR; Physical channels and modulation", ETSI TS 138 211 V15.2.0 (Jul. 2018) (Year: 2018).*

(Continued)

*Primary Examiner* — Sun Jong Kim
(74) *Attorney, Agent, or Firm* — Harness, Dickey & Pierce, P.L.C.

(57) ABSTRACT

A method for transmitting a transmission indication signal includes: receiving a transmission indication signal on a part of time-frequency resources occupied by a network device. The transmission indication signal is used to instruct a terminal to perform a corresponding terminal behavior according to terminal behavior indication information, and the terminal behavior indication information is used to indicate the terminal behavior.

20 Claims, 5 Drawing Sheets

(56) References Cited

U.S. PATENT DOCUMENTS

| | | | |
|---|---|---|---|
| 2018/0115992 A1 | 4/2018 | Park et al. | |
| 2018/0167856 A1* | 6/2018 | Li | H04W 36/324 |
| 2018/0206129 A1 | 7/2018 | Choi et al. | |
| 2019/0059105 A1* | 2/2019 | Harada | H04W 74/0816 |
| 2019/0199496 A1 | 6/2019 | Qin et al. | |
| 2019/0245666 A1 | 8/2019 | Wang et al. | |
| 2019/0297612 A1 | 9/2019 | Zhou et al. | |
| 2019/0327717 A1 | 10/2019 | Li et al. | |
| 2019/0327727 A1 | 10/2019 | Wu et al. | |
| 2021/0368541 A1* | 11/2021 | Hedayat | H04W 72/0446 |

FOREIGN PATENT DOCUMENTS

| | | | |
|---|---|---|---|
| CN | 107659994 A | 2/2018 | |
| CN | 107733563 A | 2/2018 | |
| CN | 107734666 A | 2/2018 | |
| CN | 107889114 A | 4/2018 | |
| CN | 108111291 A | 6/2018 | |
| CN | 108206714 A | 6/2018 | |
| CN | 108271261 A | 7/2018 | |
| CN | 108282297 A | 7/2018 | |
| CN | 108282876 A | 7/2018 | |
| CN | 108391315 A | 8/2018 | |
| WO | WO-2015080887 A1 | 6/2015 | |
| WO | WO-2016121917 A1 | 8/2016 | |
| WO | WO-2017018762 A1 | 2/2017 | |

OTHER PUBLICATIONS

U.S. Appl. No. 62/652,815, filed Apr. 4, 2018 (Year: 2018).*

International Search Report and Written Opinion of the International Searching Authority regarding International Application No. PCT/CN2019/101972, dated Nov. 22, 2019. Translation provided by Bohui Intellectual Property.

Supplementary European Search Report regarding Patent Application No. 19862040.3-1215/3855848; PCT/CN2019/101972, dated Nov. 11, 2021.

First Office Action regarding Chinese Patent Application No. 201811103528.6, dated Mar. 30, 2021. Translation provided by Bohui Intellectual Property.

First Office Action regarding Japanese Patent Application No. 2021-515649, dated May 2, 2022. Translation provided by Bohui Intellectual Property.

First Office Action regarding Korean Patent Application No. 10-2021-7010463, dated May 18, 2022. Translation provided by Bohui Intellectual Property.

"Discussion on physical DL channel design in unlicensed spectrum," vivo, 3GPP TSG RAN WG1 Meeting #94, R1-1808235, Aug. 24, 2018.

"Consideration on DL reference signals and channels design for NR-U," ZTE Corp., 3GPP TSG RAN WG1 Meeting #94, R1-1808319, dated Aug. 24, 2018.

"Chairman's notes of AI 7.2.2 Study on NR-based Access to Unlicensed Spectrum," Ad-Hoc chair (Ericsson), 3GPP TSG-RAN WG1 Meeting #94, R1-1809916, dated Aug. 24, 2018.

* cited by examiner

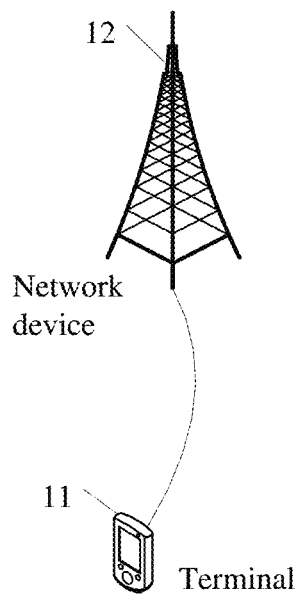
FIG. 1
Receiving a transmission indication signal on a part of time-frequency resources occupied by a network device, the transmission indication signal is used to indicate a terminal to perform a corresponding terminal behavior according to terminal behavior indication information — 21
FIG. 2
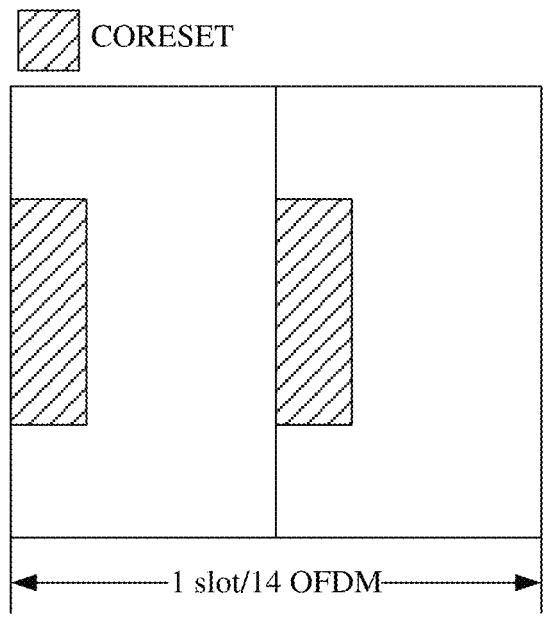
FIG. 3

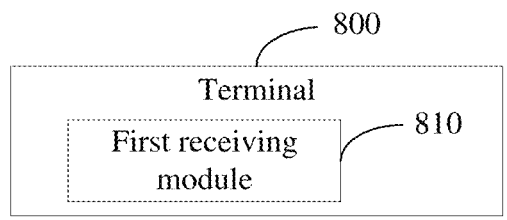
FIG. 8
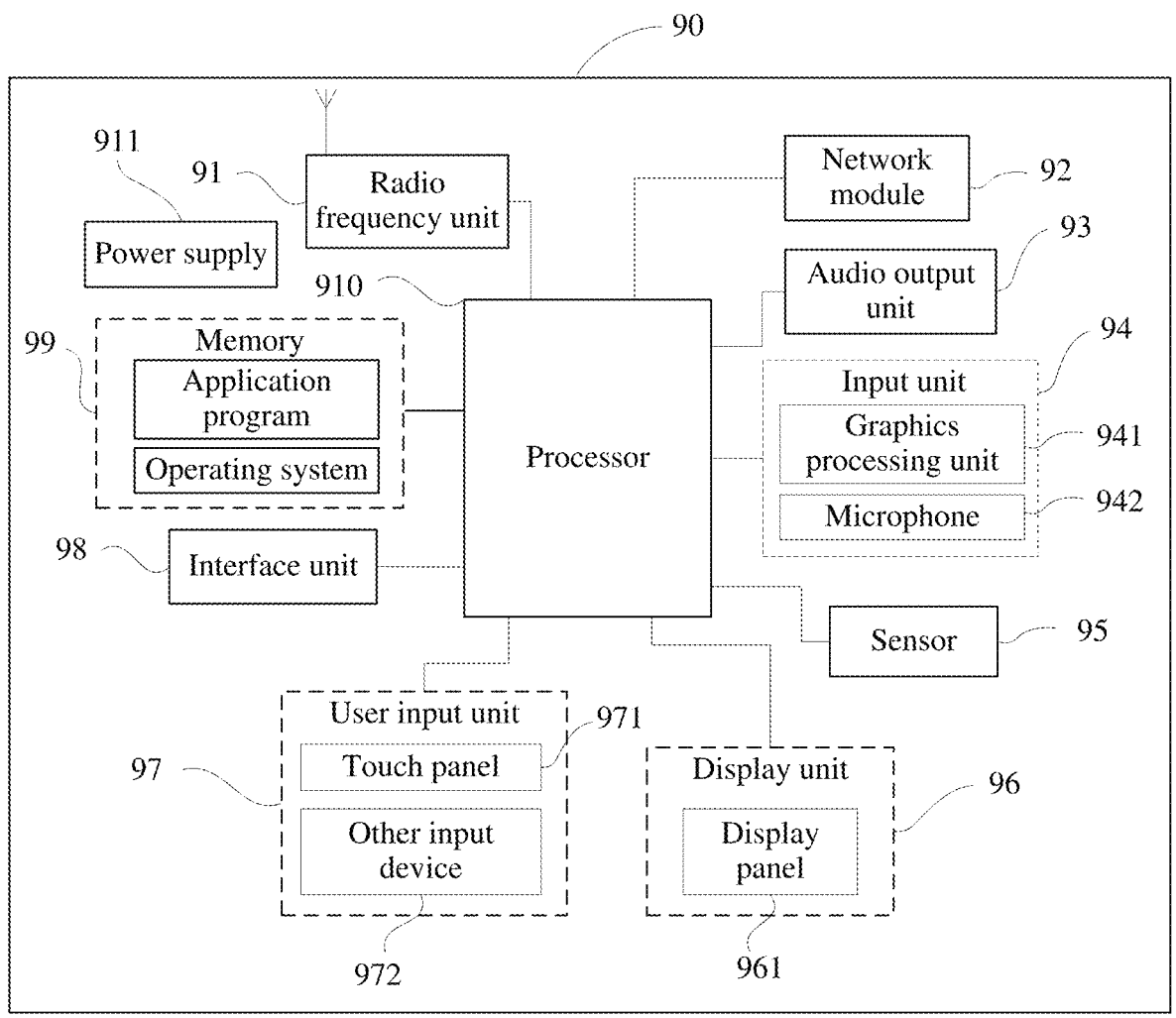
FIG. 9
Sending the transmission indication signal on a part of time-frequency resources being occupied, the transmission indication signal is used to indicate the terminal to perform the corresponding terminal behavior according to the terminal behavior indication information — 101
FIG. 10

METHOD FOR TRANSMITTING A TRANSMISSION INDICATION SIGNAL, NETWORK DEVICE, AND TERMINAL

CROSS REFERENCE TO RELATED APPLICATIONS

This application is a Bypass Continuation Application of PCT/CN2019/101972, filed on Aug. 22, 2019, which claims priority to Chinese Patent Application No. 201811103528.6 filed on Sep. 20, 2018, which are incorporated herein by reference in their entirety.

TECHNICAL FIELD

The present disclosure relates to the field of communications technologies, and in particular, to a method for transmitting a transmission indication signal, a network device, and a terminal.

BACKGROUND

In an unlicensed band of New Radio (NR), before sending information, the terminal or network device needs to perform clear channel assess (CCA)/extended clear channel assess (eCCA) to monitor the channel, that is, to perform Energy Detection (ED). When the energy is lower than a certain threshold, the channel is thus judged to be idle and transmission can be started.

SUMMARY

According to a first aspect, some embodiments of the present disclosure provide a method for transmitting a transmission indication signal, applied to terminal side, and including:
receiving a transmission indication signal on a part of time-frequency resources occupied by a network device, the transmission indication signal is used to instruct a terminal to perform a corresponding terminal behavior according to terminal behavior indication information, and the terminal behavior indication information is used to indicate the terminal behavior.

According to a second aspect, some embodiments of the present disclosure further provide a terminal, including:
a processor configured to receive a transmission indication signal on a part of time-frequency resources occupied by a network device, the transmission indication signal is used to instruct the terminal to perform a corresponding terminal behavior according to terminal behavior indication information, and the terminal behavior indication information is used to indicate the terminal behavior.

According to a third aspect, some embodiments of the present disclosure provide a terminal, including: a processor, a memory, and a computer program stored in the memory and executable on the processor. When the computer program is executed by the processor, the steps of the method for transmitting a transmission indication signal are performed.

According to a fourth aspect, some embodiments of the present disclosure provide a method for transmitting a transmission indication signal, applied to network device side, and including:
sending the transmission indication signal on a part of time-frequency resources being occupied, the transmission indication signal is used to instruct a terminal to perform a corresponding terminal behavior according to terminal behavior indication information, and the terminal behavior indication information is used to indicate the terminal behavior.

According to a fifth aspect, some embodiments of the present disclosure provide a network device, including:
a first sending module, configured to send a transmission indication signal on a part of time-frequency resources being occupied, the transmission indication signal is used to instruct a terminal to perform a corresponding terminal behavior according to terminal behavior indication information, and the terminal behavior indication information is used to indicate the terminal behavior.

According to a sixth aspect, some embodiments of the present disclosure further provide a network device, including: a processor, a memory, and a computer program stored in the memory and executable on the processor. When the computer program is executed by the processor, the steps of the method for transmitting a transmission indication signal are performed.

According to a seventh aspect, some embodiments of the present disclosure provide a non-transitory computer-readable storage medium, and the non-transitory computer-readable storage medium stores a computer program. When the computer program is executed by a processor, the steps of the method for transmitting a transmission indication signal are performed.

BRIEF DESCRIPTION OF DRAWINGS

To better clarify the technical solution of the embodiments of the present disclosure, the accompanying drawings required to illustrate the embodiments of the present disclosure will be simply described below. Obviously, the accompanying drawings described below merely illustrate some embodiments of the present disclosure. Those ordinarily skilled in the art can obtain other accompanying drawings on the basis of those accompanying drawings.

FIG. 1 is a block diagram of a mobile communication system that can be applied in some embodiments of the present disclosure;

FIG. 2 is a schematic flowchart of a method for transmitting a transmission indication signal on the terminal side according to some embodiments of the present disclosure;

FIG. 3 is a resource mapping schematic diagram of the transmission indication signal according to example 2 of the present disclosure;

FIG. 8 represents a schematic diagram of a modular structure of a terminal according to some embodiments of the present disclosure;

FIG. 9 is a terminal block diagram according to some embodiments of the present disclosure;

FIG. 10 is a schematic flowchart of transmitting method for a transmission indication signal on the network device side according to some embodiments of the present disclosure;

DESCRIPTION OF EMBODIMENTS

Figure 4:
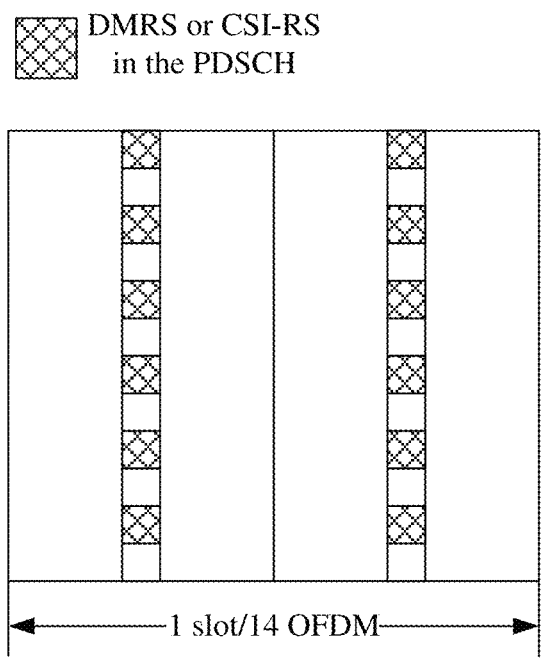
FIG. 4 is a resource mapping schematic diagram of the transmission indication signal according to example 3 of the present disclosure.

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, these embodiments are provided to enable a more thorough understanding of the present disclosure and to fully convey the scope of the present disclosure to those skilled in the art.

Terms "first", "second", etc. in the Description and Claims of the present disclosure are used to distinguish similar objects, instead of describing a specific sequence or order. It should be understood that data used in such a way can be exchanged in proper situations, so that the embodiments of the present disclosure described herein can be implemented in sequences other than those illustrated or depicted herein. In addition, the terms "comprise", "include", and any variants thereof are intended to cover non-exclusive inclusion. For example, a process, a method, a system, a product, or a device that comprises a series of steps or units is not necessarily limited to those steps or units listed expressly, but instead may include other steps or units not expressly listed or inherent to the process, the method, the product, or the device. "And/or" used in the specification and claims means at least one of the connected objects.

The technology described in this specification is not limited to the Long Term Evolution (LTE)/LTE-Advanced (LTE-A) system. It can also be applied in various wireless communication systems such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" are often used interchangeably. The technology described herein can be used in the above-mentioned systems and radio technologies as well as other systems and radio technologies. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. Alterations may be made to functions and arrangements of the discussed elements without departing from the spirit and scope of the present disclosure. In various examples, various procedures or components may be omitted, replaced, or added appropriately. For example, the described method can be performed in a different order than described, and the steps can be added, omitted or combined. In addition, features described with reference to some examples may be combined in other examples.

FIG. 1 shows a block diagram of a wireless communications system to which an embodiment of the present disclosure can be applied. The wireless communications system includes a terminal 11 and a network device 12. The terminal 11 can also be called terminal equipment or User Equipment (UE), and terminal 11 may be a mobile phone, a tablet personal computer, a laptop computer, a personal digital assistant (PDA), a mobile internet device (MID), a wearable device, an on-board equipment or other terminal equipment. It should be noted that a specific type of the terminal 11 is not limited in the embodiments of the present disclosure. A network device 12 may be a base station or a core network, and the base station may be a base station in the fifth generation cellular network technology (5G) or later releases (for example, gNB, 5G NR NB, and the like), or a base station in other communication systems (for example, eNB, wireless local area network (WLAN) access point or other access point, or the like). The base station can be called Node B, evolved Node B, access point, base transceiver station (BTS), radio base station, radio transceiver, basic service set (BSS), extended service set (ESS), Node B, evolved Node B (eNB), household Node B, household evolved Node B. WLAN access point, wireless fidelity (WiFi) node or other appropriate terms in the field, as long as the same technical effect is achieved. The base station is not limited to specific technical terms. It should be noted that in embodiments of the present disclosure, only the base station in the NR system is taken as an example, but the specific type of the base station is not limited.

The base station can communicate with the terminal 11 under the control of a base station controller. In various examples, the base station controller may be a part of the core network or some base stations. Some base stations can exchange control information or user data with the core network through backhaul. In some examples, some of these base stations can directly or indirectly communicate with each other over a backhaul link, which may be a wired or wireless communication link. The wireless communications system can support operations on a plurality of carriers (waveform signals of different frequencies). A multi-carrier transmitter can simultaneously transmit modulated signals on the plurality of carriers. For example, each communication link may be a multi-carrier signal modulated based on various radio technologies. Each modulated signal can be sent over different carriers and can carry control information (for example, a reference signal or a control channel), overhead information, data, and the like.

The base station can wirelessly communicate with the terminal 11 via one or more access point antennas. Each base station can provide communication coverage for each corresponding coverage area. A coverage area of an access point may be divided into sectors that form merely a part of the coverage area. The wireless communications system may include different types of base stations (for example, a macro base station, a micro base station, or a pico base station). The base station can also use different radio technologies, such as cellular or WLAN radio access technologies. The base station can be associated with the same or different access networks or operator deployment. Coverage areas of different base stations (including coverage areas of base stations of the same or different types, coverage areas using the same or different radio technologies, or coverage areas belonging to the same or different access networks) may overlap.

Communications links in a wireless communication system may include an uplink (UL) for carrying an UL transmission (for example, a transmission from the terminal 11 to the network device 12), or a downlink (DL) for carrying a DL transmission (for example, a transmission from the network device 12 to the terminal 11). The UL transmission may also be referred to as reverse link transmission, and the DL transmission may also be referred to as forward link transmission. The downlink transmission may be performed over a licensed frequency band, an unlicensed frequency band, or the both. Similarly, the uplink transmission may be performed over a licensed frequency band, an unlicensed frequency band, or the both.

Because the unlicensed band is shared by a plurality of technologies or a plurality of transmission nodes, such contention-based access mode leads to the uncertainty of channel available time. When the channel is available, the transmissible position of signal transmission on the network side may have been missed and the signal cannot be transmitted. As a result, the receive end might be unable to receive the signal configured on the network side normally, or perform terminal behaviors such as physical downlink control channel (PDCCH) monitoring, wireless environment monitoring and measurement, and the like according to the configuration of the network side after receiving the signal.

Some embodiments of the present disclosure provide a method for transmitting a transmission indication signal, applied to terminal side. As shown in FIG. 2, the method includes the following steps:

Step 21: receiving a transmission indication signal on a part of time-frequency resources occupied by a network device, the transmission indication signal is used to instruct a terminal to perform a corresponding terminal behavior according to terminal behavior indication information.

The terminal behavior indication information is used to indicate the terminal behavior. Taking the NR system as an example, in the unlicensed band of NR, the network device needs to monitor the channel before sending the downlink information and only sends the downlink information after monitoring that the channel is idle and the channel is successfully occupied. The transmission indication signal is used to indicate that the network device successfully occupies the idle channel, that is, after successfully occupying the idle channel, the network device sends the transmission indication signal to the terminal. In order to make the terminal detect the transmission indication signal as soon as possible, the network device can send the transmission indication signal for a plurality of times on the occupied time-frequency resource, so that it can be ensured that the terminal can receive the transmission indication signal. In this way, after receiving the transmission indication signal, the terminal can perform the corresponding terminal behavior according to previously received terminal behavior indication information.

The terminal behavior indication information is used to instruct the terminal to perform the corresponding terminal behavior and is pre-allocated to the terminal by the network device, by using but not limited to high-layer signaling, such as radio resource control (RRC) signaling, medium access control (MAC) control element (CE), or the like.

The transmission indication signal in some embodiments of the present disclosure can be transmitted in the form of a physical signal or a physical channel. For example, the transmission indication signal is transmitted in one of following forms:

PDCCH;
demodulation reference signal (DMRS) of the PDCCH;
DMRS of the physical downlink share channel (PDSCH);
channel state information reference signal (CSI-RS); or present sequence. The preset sequence includes at least one of: ZC sequence, Gold sequence or m sequence, that is, the preset sequence can be ZC sequence, Gold sequence or m sequence, or the set of a plurality of sequences of ZC sequence, Gold sequence and m sequence. Alternatively, the preset sequence includes: modulation sequence formed by at least two of ZC sequence, Gold sequence or m sequence, that is, the preset sequence can be a modulation sequence formed by at least two of ZC sequence, Gold sequence or m sequence.

That is, when the transmission indication signal is transmitted in the form of physical channel, the transmission indication signal can be transmitted through PDCCH. When the transmission indication signal is transmitted in the form of physical signal, the transmission indication signal can be transmitted through at least one of DMRS of the PDCCH, DMRS of the PDSCH, CSI-RS or preset sequence.

Before Step 21, the method in some embodiments of the present disclosure also includes: receiving configuration information of the transmission indication signal. That is, the network device can configure the transmission indication signal, the configuration information includes but is not limited to at least one of: a transmission period of the transmission indication signal, a slot in which the transmission indication signal is located, orthogonal frequency division multiplexing (OFDM) symbol positions in the slot, a quantity of OFDM symbols in the slot, RBs on the OFDM symbols, or quasi co-location (QCL) relationship. The QCL relationship includes: QCL between the transmission indication signal and at least one of the following: synchronization signal block (SSB), discovery signal, or CSI-RS. That is, the transmission indication signal may have QCL relationship with SSB, or the transmission indication signal may have QCL relationship with the discovery signal, or the transmission indication signal may have QCL relationship with CSI-RS.

The transmission indication signal is further described below with reference to application examples of different transmission forms.

Example 1: The Transmission Indication Signal is Transmitted in the Form of PDCCH When the transmission indication signal is transmitted through PDCCH, the configuration information of the transmission indication signal includes at least one of: a monitoring period of the PDCCH, monitoring duration, slot offset, OFDM symbols in the slot, a control resource set (CORESET) on which the transmission indication signal is located, downlink control information (DCI) format, DCI size, an aggregation level (AL) of control channel element (CCE), or the CCE candidate set being monitored.

A radio network temporary identity (RNTI) can be defined for the PDCCH, and a specific RNTI can be used to perform the cyclic redundancy check (CRC) scrambling for transmitting the transmission indication signal. After detecting the DCI of the PDCCH as the transmission indication signal, the terminal obtains starting time (or starting time period), duration, and end time (or end time period) of the channel occupied by the network device for signal transmission purpose according to the indication therein. The terminal can determine when to stop downlink reception according to the end time (or end time period).

Example 2: The Transmission Indication Signal is Transmitted in the Form of the DMRS of the PDCCH Within the channel occupancy time (COT) after the idle channel is occupied, the network device periodically sends the DMRS of the PDCCH. Once the terminal detects the DMRS of the PDCCH, it considers that the network device has obtained the channel resource and the transmission can be performed, then the terminal performs subsequent reception.

The DMRS of the PDCCH is bandwidth DMRS, that is, the DMRS of the PDCCH exists in each resource block (RB) of the CORESET. The time-domain position of the CORESET in which DMRS of the PDCCH is located can be predefined, for example, an 0th and/or 7th OFDM symbol(s) in each slot is the starting position of the CORESET.

In some examples, bandwidth DMRS is mapped on a resource element group (REG) of contiguous RB in the CORESET, and precoder granularity of the CORESET is the same as amounts of RBs contained in the CORESET.

The configuration information of the transmission indication signal includes: a CORESET on which the DMRS of the PDCCH is located and/or the time-domain position of the CORESET. That is, in addition to being predefined, the time-frequency resource position of the CORESET of PDCCH-DMRS can also be configured by the network device, for example, by using the high-layer signaling. The time-frequency resource of the CORESET transmitting the DMRS of the PDCCH can be periodic, that is, the network device can send the transmission indication signal to the terminal according to a fixed period.

For example, as shown in FIG. 3, the network device transmits the DMRS of the PDCCH on a 0th and/or 7th OFDM symbol(s) of each slot in a period of every 7 to 14 OFDM symbols within the COT after a channel is occupied. The period can be predefined or configured by using high-layer signaling. The CORESET of DMRS of the PDCCH can be a CORESET that occupies two OFDM symbols and the bandwidth of the CORESET is 48 RBs.

Example 3: The Transmission Indication Signal is Transmitted in the Form of the DMRS of the PDSCH or the CSI-RS Within the COT after the channel is occupied, the network device transmits the DMRS of the PDSCH or the CSI-RS. Once the terminal detects the DMRS of the PDSCH or CSI-RS, it considers that the network device has obtained the idle channel resource and the transmission can be performed, then the terminal performs subsequent reception.

The time-domain position of the DMRS of the PDSCH or the CSI-RS can be predefined, for example, regularly transmitting on a 3rd and 10th OFDM symbols in each slot. Alternatively, the time-domain position of the DMRS of the PDSCH or the CSI-RS can be configured by network device. The time resource transmitting the DMRS of the PDSCH or the CSI-RS can be periodic, that is, the network device can send the transmission indication signal to the terminal according to a fixed period.

For example, as shown in FIG. 4, the network device transmits the DMRS of the PDSCH or the CSI-RS on the 3rd and 10th OFDM symbols of each slot in a period of every 7 to 14 OFDM symbols within the COT after a channel is occupied. The period can be predefined or configured by using high-layer signaling. The transmission of the DMRS of the PDSCH or the CSI-RS by the network device can be defined as full bandwidth transmission, single port transmission or multi-port transmission. Alternatively, the network device can also configure the RBs occupied by transmission of DMRS of the PDSCH or the CSI-RS, the corresponding port number, scrambled identifier (ID), and the like through high-layer signaling.

In some examples, when the transmission indication signal is transmitted through DMRS of the PDSCH, the configuration information of the transmission indication signal includes: OFDM symbols of the DMRS of the PDSCH and/or RBs on the OFDM symbols. For example, DMRS of the PDSCH is transmitted in some or all RBs of the corresponding OFDM symbol in the transmission channel bandwidth.

When the transmission indication signal is transmitted through the CSI-RS, the configuration information of the transmission indication signal includes at least one of: port number of the CSI-RS, period, time-domain position, the frequency domain position, density, a code division multiple (CDM) type, power, RBs at the time-domain position, scrambled ID, or transmission configuration indicator (TCI) state. For example, CSI-RS is transmitted in some or all RBs of the corresponding OFDM symbol in the transmission channel bandwidth. In addition, CSI-RS can be configured in form of tracking reference signal (TRS).

Example 4: The Transmission Indication Signal is Transmitted in the Form of Preset Sequence When the transmission indication signal is transmitted through the preset sequence, the configuration information of the transmission indication signal includes at least one of: generation parameters of the preset sequence, period, time-domain resource (such as system frame, subframe, slot, OFDM symbol, and the like), power, or transmission resource of the preset sequence. For example, the time-frequency resource occupied by one transmission of the resource can occupy multiple RBs on one OFDM symbol, or one RB on multiple OFDM symbols in one slot.

The generation parameters of preset sequence are related to the time information of the channel occupancy time (COT) of the network device, and the time information includes: at least one of: starting time, duration, or end time of the COT. The starting time of COT can also be called its starting time (or starting time period) of COT, and the end time of COT can also be called its end time (or end time period). According to the detection of preset sequence, the terminal can obtain the COT information currently transmitted by the network device, such as the COT starting time, duration, end time, and the like.

Figure 5:
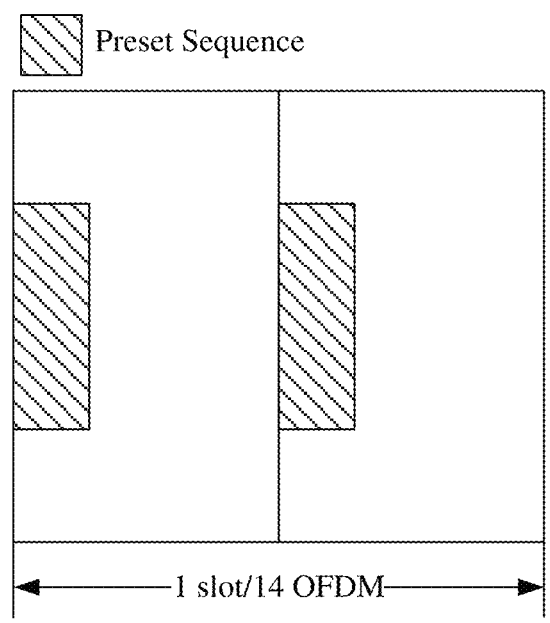
FIG. 5 is a resource mapping schematic diagram 1 of the transmission indication signal according to example 4 of the present disclosure.

The preset sequence is transmitted periodically in the COT of the network device, for example, as shown in FIG. 5, the preset sequence is sent every 7 or 14 OFDM symbols periodically in the COT. The transmission period and time-domain resource position can be configured by using high-layer signaling.

Figure 6:
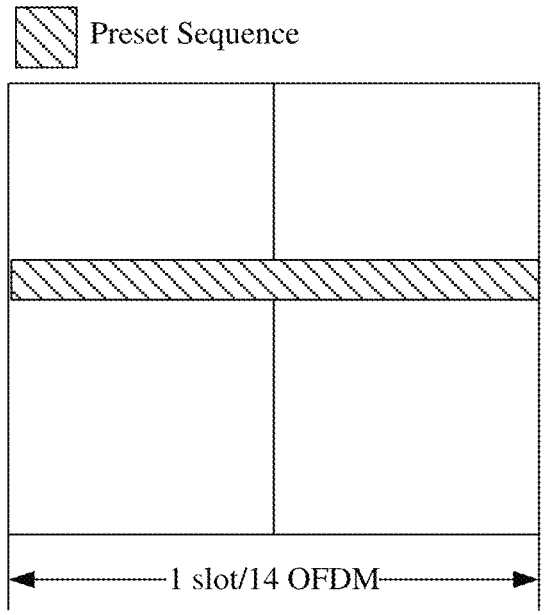
FIG. 6 is a resource mapping schematic diagram 2 of the transmission indication signal according to the example 4 of the present disclosure.

The preset sequence can also be transmitted on a part of the physical resource blocks (PRB) within the channel bandwidth, that is, a part of the PRBs is specially reserved for transmission of the preset sequence, and the preset sequence can be repeatedly transmitted in the time direction within the RB bandwidth, and/or, mapped according to the sequence of frequency first and then time direction. As shown in FIG. 6, the preset sequence is transmitted on an RB. In addition, the preset sequence can also be sent on multiple RBs, which can be contiguous or discontiguous. The transmitted RB(s) can be predefined or configured by using high-layer signaling.

1. It is assumed that the transmission indication signal is transmitted in the form of m sequence, and the generation formula of the transmission indication signal is as follows:

$$d_{seq}(n)=[1-2x_0((n+m_0) \bmod 127)][1-2x_1((n+m_1) \bmod 127)].$$

m_0 and m_1 are cyclic shift values, $0 \leq n < M$, and M is the sequence length. The cyclic shift value and sequence length can be predefined or configured by using high-layer signaling. The cyclic shift value may be related to the cell ID. The cyclic shift value of different m sequences can be related to the information of COT. The information includes: COT starting time (period), COT duration, COT end time (period), and the like. The terminal can determine when to stop the downlink reception according to the COT end time (period).

For example, the same generator polynomial the same as that of the secondary synchronization signal (SSS) can be used as follows:

$$d_{seq}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5 N_{ID}^{(2)}$$

$$m_1 = N_{ID}^{(1)} \bmod 112$$

$$0 \leq n < M, M \geq 127, x_0(i + 7) = (x_0(i + 4) + x_0(i)) \bmod 2,$$

$$x_1(i + 7) = (x_1(i + 1) + x_1(i)) \bmod 2, \text{ and}$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1].$$

When M is greater than 127, the first 127 sequence symbols are the same as SSS, and the terminal can perform measurement on the 127 resource elements (RE) by using the existing measurement module based on SSS. When M=127, the sequence is exactly the same as SSS sequence. It should be noted that although the sequence is exactly the same, as SSS is not in a traditional SSB structure, that is, there are no primary synchronization signal (PSS), PBCH, and PBCH-DMRS in adjacent resources, the signal cannot be considered as a SSS. The m sequence may be transmitted over discrete or contiguous resources in time and/or frequency directions.

2. It is assumed that the transmission indication signal is transmitted in the form of ZC sequence, root index, sequence group number, sequence number and cyclic shift value of the ZC sequence are predefined or configured by using high-layer signaling. The cyclic shift value may also be related to the cell ID. The root index, sequence group number, sequence number and cyclic shift value of different ZC sequences can be related to the information of COT, which includes at least one of: COT starting time (period), COT duration, or COT end time (period), and the like. The terminal can determine when to stop the downlink reception according to the COT end time (period). The ZC sequence may be transmitted over discrete or contiguous resources in time and/or frequency directions.

3. It is assumed that the transmission indication signal is transmitted in the form of Gold sequence, and the initialization mode of the Gold sequence is related to at least one of the following: COT starting time (period), COT duration, COT end time (period), cell ID, OFDM symbol number of the sequence, and the like. The terminal can determine when to stop the downlink reception according to the COT end time (period). For example:

$$c_{init}=(T_{COT}+1) \cdot (2N_{ID}^{cell}+1) \cdot 2^{16}.$$

$T_{COT}$ is the relevant information in the COT, for example, the slot indicating the end of the COT, the terminal can perform blind detection of the sequence, and determine the value of the $T_{COT}$ based on the detection results, thereby determining the end slot of the COT. After the end slot, it is not necessary for the terminal to receive downlink PDCCH or PDSCH and perform measurement based on the downlink RS.

4. It is assumed that the transmission indication signal is transmitted in the form of modulation sequence, for example, the transmission indication signal is a modulation sequence after modulation of at least two sequences; and the two sequences can be at least two of m sequence, ZC sequence or Gold sequence. The modulation herein refers to: modulo two addition at the bit level of two binary sequences, that is, scrambling; or the modulation at the symbol level, such as the multiplication of the symbol level after mapping at least one of the two sequences to symbol. For example, the symbol-level multiplication of two m sequences, and the symbol-level multiplication of ZC sequence and Gold sequence. For example, d1 and d2 are two different bit sequences or symbol sequences: $d(n)=d_1(n) \cdot d_2(n)$, $0 \leq n \leq N-1$, and N is the length of the sequence.

Figure 7:
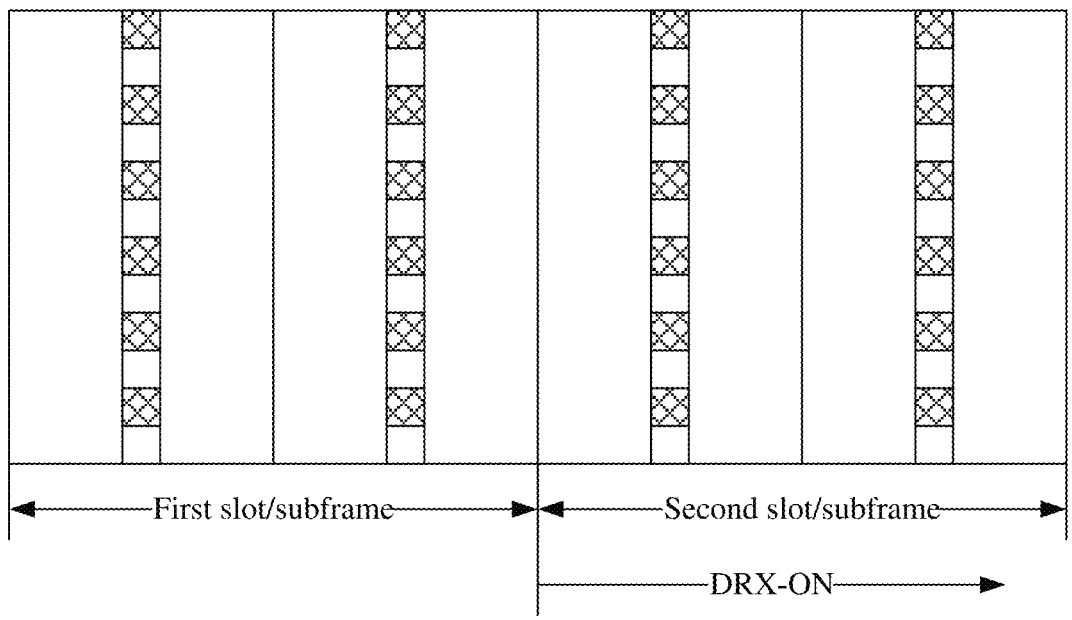
FIG. 7 is a resource mapping schematic diagram of the transmission indication signal in the DRX scenario according to some embodiments of the present disclosure.

It is worth pointing out that when a terminal works in the discontiguous reception (DRX) scenario, it only needs to detect the transmission indication signal during the active or On duration period of DRX. As shown in FIG. 7, if the idle channel obtained by the network device starts from the first subframe, and the DRX active time of the terminal starts from the second subframe. In this case, the terminal only needs to detect the transmission indication signal during the DRX active period. The network device needs to send the transmission indication signal periodically and repeatedly in the channel occupied for signal transmission, so that it can be ensured that different terminals with different DRX active times can detect the transmission indication signal as soon as possible.

In some examples, after receiving the transmission indication signal, that is, after Step 21, the method further includes: receiving the downlink physical signal or the downlink physical channel; and the downlink physical signal or the downlink physical channel being not overlapped with the transmission resource of the transmission indication signal. It is assumed that the downlink physical signal or the downlink physical channel resource scheduled by the network device is the same as a part of RE/RB resources occupied by the transmission indication signal, the downlink physical signal or the downlink physical channel is not mapped on these REs/RBs, and the terminal considers that the downlink physical signal or the downlink physical channel matches the rate of these RE/RB resources. The downlink physical channel includes at least one of: physical broadcast channel (PBCH), PDCCH, and PDSCH.

In some embodiments of the present disclosure, the terminal behavior indication information can be transmitted by the network device through high-layer signaling or medium access control (MAC) control element (CE), and the terminal behavior indication information is used to instruct the terminal to perform at least one of the following behaviors:
PDCCH monitoring;
CSI measurement, such as channel and/or interference measurement, including Layer 1 reference signal received power (L1-RSRP), channel quality indicator (CQI), precoding matrix indicator (PMI), rank indication (RI), and the like;
radio resource management (RRM) measurement, such as reference signal received power (RSRP), reference signal received quality (RSRQ), received signal strength indicator (RSSI), and the like;
beam management measurement;
radio link monitoring; or,
beam failure detection.

In the method for transmitting a transmission indication signal in some embodiments of the present disclosure, after receiving the transmission indication signal, the terminal may perform the corresponding terminal behavior according to the terminal behavior indication information, so that unnecessary behavior attempts can be avoided, the transmission performance can be improved, and the power consumption of the terminal can be reduced.

The above embodiments respectively introduce the method for transmitting a transmission indication signal in different scenarios in detail, and the terminal corresponding to the method will be further introduced with reference to the accompanying drawings.

As shown in FIG. 8, the terminal 800 in some embodiments of the present disclosure can receive the transmission indication signal on a part of time-frequency resources occupied by the network device in the embodiment, the transmission indication signal is used to instruct the terminal to perform the corresponding terminal behavior according to the terminal behavior indication information, and the terminal behavior indication information is used to indicate the details of the terminal behavior methods, and the same effects can be achieved. The terminal 800 includes the following function modules:
a first receiving module 810, configured to receive the transmission indication signal on a part of time-frequency resources occupied by the network device, where the transmission indication signal is used to instruct the terminal to perform the corresponding terminal behavior according to the terminal behavior indication information, and the terminal behavior indication information is used to indicate the terminal behavior.

The transmission indication signal can be transmitted in one of the following forms:
physical downlink control channel (PDCCH);
demodulation reference signal (DMRS) of the PDCCH;
DMRS of the Physical Downlink Share Channel (PDSCH);
channel state information reference signal (CSI-RS); or preset sequence.

The preset sequence includes at least one of: ZC sequence, Gold sequence or m sequence, or includes: a modulation sequence formed by at least two of ZC sequence, Gold sequence or m sequence.

DMRS of the PDCCH is bandwidth DMRS.

The bandwidth DMRS is mapped on Resource Element Group (REG) of contiguous Resource Block (RB) in the Control Resource set (CORESET), and the Precoder Granularity of CORESET is the same as the amount of RBs contained in the CORESET.

The time-domain position of the CORESET on which the DMRS of the PDCCH is located is predefined.

The time-domain position of the DMRS or CSI-RS of PDSCH is predefined.

The terminal 800 further includes:
a second receiving module, configured to receive the configuration information of the transmission indication signal.

The configuration information includes at least one of: the transmission period of the transmission indication signal, the slot, OFDM symbol positions in the slot, the quantity of OFDM symbols in the slot, the RBs on the OFDM symbols, or QCL relationship.

The QCL relationship includes: quasi co-location (QCL) between the transmission indication signal and at least one of the following: synchronization signal block (SSB), discovery signal or CSI-RS.

When the transmission indication signal is transmitted through PDCCH, the configuration information includes: at least one of: the monitoring period of the PDCCH, the monitoring duration, slot offset, OFDM symbols in the slot, CORESET on which the transmission indication signal is located, DCI format, DCI size, AL of the CCE, or the CCE candidate set being monitored.

When the transmission indication signal is transmitted through DMRS of the PDCCH, the configuration information includes: the CORESET on which the DMRS of the PDCCH is located and/or the time-domain position of the CORESET.

When the transmission indication signal is transmitted through DMRS of the PDSCH, the configuration information includes: OFDM symbols of the DMRS of the PDSCH and/or RBs on the OFDM symbols.

When the transmission indication signal is transmitted through CSI-RS, the configuration information includes at least one of: port number of the CSI-RS, period, the time-domain position, the frequency domain position, density, the code division multiple (CDM) type, power, RBs at the time-domain position, scrambled ID, or transmission configuration indicator (TCI) state.

When the transmission indication signal is transmitted through the preset sequence, the configuration information includes at least one of: generation parameters of the preset sequence, period, the time-domain resource, power or transmission resource of the preset sequence.

The generation parameters of preset sequence are related to the time information of the channel occupancy time (COT) of the network device, and the time information includes at least one of: starting time, duration, or end time of the COT.

The terminal 800 further includes:
a third receiving module, configured to receive the downlink physical signal or the downlink physical channel; and the downlink physical signal or the downlink physical channel being not overlapped with the transmission resource of the transmission indication signal.

The downlink physical channel includes at least one of: physical broadcast channel (PBCH), PDCCH, or PDSCH.

The terminal behavior indication information is transmitted by the network device through high-layer signaling or medium access control (MAC) control element (CE), and the terminal behavior indication information is used to instruct the terminal to perform at least one of the following behaviors:
PDCCH monitoring;
CSI measurement;
radio resource management (RRM) measurement;

beam management measurement;
radio link monitoring; or,
beam failure detection.

It is worth pointing out that after receiving the transmission indication signal, the terminal in some embodiments of the present disclosure can perform the corresponding terminal behavior according to the terminal behavior indication information so that unnecessary behavior attempts can be avoided, the transmission performance can be improved, and the power consumption of the terminal can be reduced.

To better achieve the objective, FIG. 9 is a schematic structural diagram of hardware of a terminal for implementing the various embodiments of the present disclosure. The terminal 90 includes, but is not limited to: components such as a radio frequency unit 91, a network module 92, an audio output unit 93, an input unit 94, a sensor 95, a display unit 96, a user input unit 97, an interface unit 98, a memory 99, a processor 910, and a power supply 911. A person skilled in the art may understand that the structure of the terminal shown in FIG. 9 does not constitute a limitation on the terminal. The terminal may include more or fewer components than that shown in the figure, or some components may be combined, or an arrangement of different components is used. In the embodiments of the present disclosure, the terminal includes, but is not limited to, a mobile phone, a tablet computer, a notebook computer, a palmtop computer, a vehicle-mounted terminal, a wearable device, a pedometer, or the like.

The radio frequency unit 91 is configured to transmit and receive data under the control of the processor 910, and to: receive the transmission indication signal on a part of time-frequency resources occupied by the network device. The transmission indication signal is used to instruct the terminal to perform the corresponding terminal behavior according to the terminal behavior indication information, and the terminal behavior indication information is used to indicate the terminal behavior.

After receiving the transmission indication signal, the terminal in some embodiments of the present disclosure can perform the corresponding terminal behavior according to the terminal behavior indication information so that unnecessary behavior attempts can be avoided, the transmission performance can be improved, and the power consumption of the terminal can be reduced.

It should be understood that in the embodiments of the present disclosure, the radio frequency unit 91 can be configured to receive and send information or receive and send signal during calls. The radio frequency unit receives downlink data from a base station, and transmits the downlink data to the processor 910 for processing. In addition, the radio frequency unit sends uplink data to the base station. The radio frequency unit 91 includes, but is not limited to, an antenna, at least one amplifier, a transceiver, a coupler, a low noise amplifier, a duplexer, and the like. In addition, the radio frequency unit 91 may communicate with a network and another device through a wireless communication system.

The terminal provides a user with wireless broadband Internet access through the network module 92, for example, helping the user send and receive emails, browse web pages, and access streaming media.

The audio output unit 93 may convert audio data received by the radio frequency unit 91 or the network module 92 or stored in the memory 99 into an audio signal and output the audio signal as a sound. Moreover, the audio output unit 93 may further provide audio output (for example, call signal receiving sound and message receiving sound) related to a specific function performed by the terminal 90. The audio output unit 93 includes a speaker, a buzzer, a receiver, and the like.

The input unit 94 is configured to receive audio or video signals. The input unit 94 may include a graphics processing unit (Graphics Processing Unit, GPU) 941 and a microphone 942. The graphics processing unit 941 processes image data of a static image or video obtained by an image capture apparatus (such as, a camera) in a video capture mode or an image capture mode. A processed image frame may be displayed on the display unit 96. An image frame processed by a Graphics Processing Unit 941 may be stored in the memory 99 (or another storage medium) or sent by the radio frequency unit 91 or the network module 92. The microphone 942 may receive a sound and can process such sound into audio data. The processed audio data may be converted, in a call mode, into a format that can be sent by using the radio frequency unit 91 to a mobile communication base station, and the format is output.

The terminal 90 further includes at least one sensor 95, such as an optional sensor, a motion sensor, and another sensor. The light sensor includes an ambient light sensor and a proximity sensor, the ambient light sensor can adjust brightness of the display panel 961 based on brightness of ambient light, and the proximity sensor can turn off the display panel 961 and/or backlight when the terminal 90 moves towards the car. As a type of motion sensor, an accelerometer sensor may detect an acceleration value in each direction (generally, three axes), and detect a value and a direction of gravity when the accelerometer sensor is static, and may be configured to recognize a mobile terminal posture (such as screen switching between landscape and portrait modes, a related game, or magnetometer posture calibration), and perform a function related to vibration recognition (such as a pedometer or a knock), and the like. The sensor 95 may further include a fingerprint sensor, a pressure sensor, an iris sensor, a molecular sensor, a gyroscope, a barometer, a hygrometer, a thermometer, an infrared sensor, and the like. Details are not described herein again.

The display unit 96 is configured to display information entered by a user or information provided for a user. The display unit 96 may include a display panel 961, and the display panel 961 may be configured in a form of liquid crystal display (liquid crystal display, LCD), organic light-emitting diode (organic light-emitting diode, OLED), or the like.

The user input unit 97 can be configured to receive the inputted digital or character information, and generate key signal input related to user setting and function control of the terminal. The user input unit 97 includes a touch panel 971 and another input device 972. The touch panel 971, also known as a touch screen, can collect a touch operation performed by a user on or near the touch panel (for example, an operation performed by the user on the touch panel 971 or near the touch panel 971 with any suitable object or accessory such as a finger or a stylus). The touch panel 971 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor 910, and receives and executes a command from the processor 910. In addition, the touch panel 971 may be implemented in various types such as a resistor, a capacitor, an infrared ray, or a surface acoustic wave. The user input unit 97 may include the another input device 972 in addition to the touch panel 971. An another input device 972 may include, but is not limited to, a physical keyboard, a functional button (such as a volume control button, or a power on/off button), a trackball, a mouse, and a joystick. Details are not described herein again.

The touch panel 971 may cover the display panel 961. When detecting a touch operation on or near the touch panel 971, the touch panel 971 transmits the touch operation to the processor 910 to determine a type of a touch event, and then the processor 910 provides corresponding visual output on the display panel 961 based on the type of the touch event. In FIG. 9, the touch panel 971 and the display panel 961 are used as two independent components to implement input and output functions of the terminal. However, in some embodiments, the touch panel 971 and the display panel 961 may be integrated to implement the input and output functions of the terminal. This is not specifically limited herein.

The interface unit 98 is an interface connecting an external apparatus to the terminal 90. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 98 may be configured to receive an input (for example, data information and power) from an external apparatus and transmit the received input to one or more elements within the terminal 90, or may be configured to transmit data between the terminal 90 and the external apparatus.

The memory 99 may be configured to store software programs and various data. The memory 99 may mainly include a program storage area and a data storage area. The program storage area may store an operating system, an application program required for at least one function (such as an audio playing function and an image playing function, etc.) etc. The data storage area may store data (such as audio data and a phone book, etc.) created according to use of the mobile phone. In addition, the memory 99 may include a high speed random access memory, and may further include a non-volatile memory, such as at least one magnetic disk memory device, a flash memory device, or may include other non-volatile solid state memory devices.

The processor 910 is a control center of the terminal, and is connected to all the parts of the entire terminal by using various interfaces and lines. It performs various functions of the terminal and processes data by running or executing the software programs and/or modules stored in the memory 99 and by invoking data stored in the memory 99, it performs overall monitoring of the terminal. The processor 910 may include one or more processing units. Optionally, the processor 910 may be integrated with an application processor and a modem processor. The application processor mainly processes the operating system, the user interface, applications, etc. The modem processor mainly processes wireless communication. It may be understood that, alternatively, the modem processor may not be integrated into the processor 910.

The terminal 90 may also include a power supply 911 (for example, a battery) that supplies power to various components. Optionally, the power supply 911 may be logically connected to the processor 910 through a power supply management system, to perform functions of managing charging, discharging, and power consumption through the power supply management system.

In addition, the terminal 90 includes some functional modules not shown. Details are not described herein again.

Optionally, some embodiments of the present disclosure further provide a terminal, including a processor 910, a memory 99, and a computer program stored in the memory 99 and executable on the processor 910. When the computer program is executed by the processor 910, the processes of the embodiments of the method for transmitting a transmission indication signal may be implemented, and a same technical effect can be achieved. To avoid repetition, details are not described herein again. The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (or referred to as a "cellular" phone) and a computer with a mobile terminal, and may be, for example, a portable, pocket-sized, handheld, computer built-in, or vehicle-mounted mobile apparatus, which exchange language and/or data with a radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal may also be referred to as a system, a subscriber unit, a subscriber station, a mobile station, a mobile console (Mobile), a remote station, a remote terminal, an access terminal, a user terminal, a user agent, or a user device or user equipment. This is not limited herein.

Some embodiments of the present disclosure further provide a non-transitory computer-readable storage medium, the non-transitory computer-readable storage medium stores a computer program. When the computer program is executed by a processor, the steps of the method for transmitting a transmission indication signal are performed, and a same technical effect can be achieved. To avoid repetition, details are not described herein again. The non-transitory computer-readable storage medium is, for example, a Read-Only Memory (ROM), a Random Access Memory (RAM) or an optical disc.

The above embodiments introduce method for transmitting a transmission indication signal in the present disclosure from the terminal side, and the method for transmitting a transmission indication signal from the network device side will be further introduced with reference to the accompanying drawings in the following embodiment of the present disclosure.

As shown in FIG. 10, a transmitting method provided in some embodiment of the present disclosure for transmission indication signal, and applied to network device side, includes the following steps:

Step 101: sending the transmission indication signal on a part of time-frequency resources being occupied, the transmission indication signal is used to instruct the terminal to perform the corresponding terminal behavior according to the terminal behavior indication information.

The terminal behavior indication information is used to indicate the terminal behavior. For example, the terminal behavior indication information is used to instruct the terminal to perform at least one of the following behaviors: PDCCH monitoring; CSI measurement; radio resource management (RRM) measurement; beam management measurement; radio link monitoring; and beam failure detection. The network device can send the terminal behavior indication information to the terminal through high-layer signaling or MAC CE.

Taking the NR system as an example, in the unlicensed band of NR, the network device needs to monitor the channel before sending the downlink information and only sends the downlink information after monitoring that the channel is idle and the channel is successfully occupied. The transmission indication signal is used to indicate that the network device successfully occupies the idle channel, that is, after successfully occupying the idle channel, the network device sends the transmission indication signal to the terminal to indicate that the terminal network device successfully occupies the idle channel. In order to make the terminal detect the transmission indication signal as soon as possible, the network device can send the transmission indication signal for a plurality of times in the occupied time-frequency resource, so that it can be ensured that the terminal can receive the transmission indication signal.

The transmission indication signal in the embodiments of the present disclosure can be sent in the form of a physical signal or a physical channel. For example, the transmission indication signal is sent in one of the following forms:

Physical Downlink Control Channel (PDCCH),
Demodulation Reference Signal (DMRS) of the PDCCH,
DMRS in the Physical Downlink Share Channel (PDSCH);
Channel State Information Reference Signal (CSI-RS), and
preset sequence. The preset sequence includes at least one of: the ZC sequence, Gold sequence or m sequence, that is, a preset sequence can be ZC sequence, Gold sequence or m sequence, or the set of multiple sequences in ZC sequence, Gold sequence and m sequence. Alternatively, the preset sequence includes: a modulation sequence formed by at least two of ZC sequence, Gold sequence or m sequence, that is, a preset sequence can be a modulation sequence formed by at least two of ZC sequence, Gold sequence or m sequence.

Before Step 101, the method also includes: sending the configuration information of the transmission indication signal to the terminal. That is, the network device can configure the transmission indication signal, the configuration information includes but is not limited to at least one of: the transmission period of the transmission indication signal, the slot in which the transmission indication signal is located, OFDM symbol positions in the slot, the quantity of OFDM symbols in the slot, the RBs on the OFDM symbols, or QCL relationship. The QCL relationship includes: quasi co-location (QCL) between the transmission indication signal and at least one of the following: synchronization signal block (SSB), discovery signal and CSI-RS. That is, the transmission indication signal may have QCL relationship with SSB, the transmission indication signal may have QCL relationship with the discovery signal, and the transmission indication signal may have QCL relationship with CSI-RS.

The transmission indication signal in the present disclosure is further described below with reference to embodiments of different transmission forms.

Corresponding to Example 1, the transmission indication signal is sent in the form of PDCCH.

When the transmission indication signal is transmitted through PDCCH, the configuration information of the transmission indication signal includes at least one of: the monitoring period of the PDCCH, the monitoring duration, slot offset, OFDM symbols in the slot, control resource set (CORESET) on which the transmission indication signal is located, downlink control information (DCI) format, DCI size, aggregation level (AL) of the control channel element (CCE), or the CCE candidate set being monitored.

Corresponding to the Example 2, the transmission indication signal is sent in the form of DMRS of PDCCH.

Within the Channel Occupancy Time (COT) after the idle channel is occupied, the network device periodically sends the DMRS of the PDCCH.

The DMRS of the PDCCH is the bandwidth DMRS, that is, the DMRS of the PDCCH exists in each RB of the Control Resource set (CORESET). The time-domain position of the CORESET in which DMRS of the PDCCH is located can be predefined, for example, the $0^{th}$ and/or $7^{th}$ OFDM symbol(s) in each slot is the starting position of the CORESET.

The bandwidth DMRS is mapped on resource element group (REG) of the contiguous resource block (RB) in the control resource set (CORESET), and the precoder granularity of CORESET is the same as the amount of RBs contained in the CORESET.

The configuration information of the transmission indication signal includes: CORESET the DMRS of the PDCCH is located and/or the time-domain position of the CORESET. That is, in addition to being predefined, the time-frequency resource position of the CORESET of PDCCH-DMRS can also be configured by the network device, for example through the high-layer signaling.

Corresponding to the Example 3: the transmission indication signal is sent in the form of DMRS or CSI-RS of the PDSCH.

Within the COT after the channel is occupied, the network device transmits the DMRS/CSI-RS of the PDSCH. The time-domain position of the DMRS or CSI-RS of the PDSCH can be predefined, for example, regularly transmitting on the 3rd and 10th OFDM symbols in each slot. Alternatively, the time-domain position of the DMRS or CSI-RS of the PDSCH can be configured by network device. The time resource transmitting the DMRS or CSI-RS of the PDSCH can be periodic, that is, the network device can send the transmission indication signal to the terminal according to a fixed period.

When the transmission indication signal is transmitted through DMRS of the PDSCH, the configuration information of the transmission indication signal includes: OFDM symbols of the DMRS of the PDSCH and/or the RBs on the OFDM symbols. For example, DMRS of the PDSCH is transmitted in some or all RBs of the corresponding OFDM symbol in the transmission channel bandwidth.

When the transmission indication signal is transmitted through CSI-RS, the configuration information of the transmission indication signal includes at least one of: port number of the CSI-RS, period, the time-domain position on which the transmission indication signal is located, the frequency domain position, density, the code division multiple (CDM) type, power, RBs at the time-domain position, scrambled ID, and transmission configuration indicator (TCI) state. For example, CSI-RS is transmitted in some or all RBs of the corresponding OFDM symbol in the transmission channel bandwidth. In addition, CSI-RS can also be configured in form of Tracking Reference Signal (TRS).

Corresponding to Example 4, the transmission indication signal is sent in the form of preset sequence.

When the transmission indication signal is transmitted through the preset sequence, the configuration information of the transmission indication signal includes at least one of: generation parameters of the preset sequence, period, the time-domain resource, power or transmission resource of the preset sequence. For example, the time-frequency resource occupied by one transmission of the resource can occupy multiple RBs on one OFDM symbol, or one RB on multiple OFDM symbols in one slot.

The generation parameters of preset sequence are related to the time information of the channel occupancy time (COT) of the network device, and the time information includes at least one of: the COT starting time, duration, and end time. Then, according to the detection of preset sequence, the terminal can obtain the COT information currently transmitted by the network device, such as the COT starting time, duration, end time, and the like.

After sending the transmission indication signal, that is, after Step 101, the method further includes: sending the downlink physical signal or the downlink physical channel to the terminal; and the downlink physical signal or the downlink physical channel being not overlapped with the transmission resource of the transmission indication signal. It is assumed that the downlink physical signal or the downlink physical channel resource scheduled by the network device is the same as a part of RE/RB resources occupied by the transmission indication signal, the downlink physical signal or the downlink physical channel shall not be mapped on these REs/RBs, so as to avoid the overlapping of the downlink physical signal or the downlink physical channel with the transmission resource of the transmission indication signal. The downlink physical channel includes at least one of: physical broadcast channel (PBCH), PDCCH, and PDSCH.

The network device in some embodiments of the present disclosure send the transmission indication signal to the terminal to indicate the terminal to perform the corresponding terminal behavior according to the terminal behavior indication information, so that unnecessary behavior attempts by the terminal can be avoided, the transmission performance can be improved, and the power consumption of the terminal can be reduced.

The above embodiments introduce the method for transmitting a transmission indication signal in different scenarios, and the corresponding terminals will be further introduced with reference to the accompanying drawings and the corresponding network devices in the following embodiment of the present disclosure.

Figure 11:
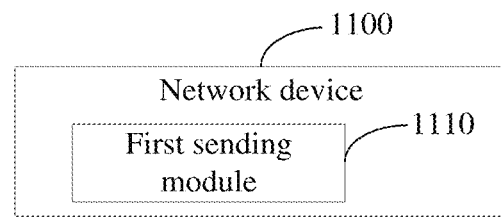
FIG. 11 represents a schematic diagram of a modular structure of a network device according to some embodiments of the present disclosure.

As shown in FIG. 11, the network device 1100 in the embodiments of the present disclosure can send the transmission indication signal on a part of time-frequency resources occupied by the network device in the embodiment, the transmission indication signal is used to instruct the terminal to perform the corresponding terminal behavior according to the terminal behavior indication information, and the same effects can be achieved. The network device 1100 includes the following function modules:

a first sending module 1110, configured to send the transmission indication signal on a part of time-frequency resources being occupied. The transmission indication signal is used to instruct the terminal to perform the corresponding terminal behavior according to the terminal behavior indication information, and the terminal behavior indication information is used to indicate the terminal behavior.

The transmission indication signal can be sent in one of the following forms:
Physical Downlink Control Channel (PDCCH);
Demodulation Reference Signal (DMRS) of the PDCCH;
DMRS in the Physical Downlink Share Channel (PDSCH);
Channel State Information Reference Signal (CSI-RS), or preset sequence.

The preset sequence includes: at least one of: ZC sequence, Gold sequence or m sequence, or includes: a modulation sequence formed by at least two of ZC sequence, Gold sequence or m sequence.

DMRS of the PDCCH is bandwidth DMRS.

The bandwidth DMRS is mapped on Resource Element Group (REG) of contiguous Resource Block (RB) in the Control Resource set (CORESET), and the Precoder Granularity of CORESET is the same as the amount of RBs contained in the CORESET.

The time-domain position of the CORESET on which the DMRS of the PDCCH is located is predefined.

The time-domain position of the DMRS or CSI-RS of PDSCH is predefined.

The network device 1100 further includes:
a second sending module, configured to send the configuration information of the transmission indication signal to the terminal.

The configuration information includes at least one of: the transmission period of the transmission indication signal, the slot in which the transmission indication signal is located, OFDM symbol positions in the slot, the quantity of OFDM symbols in the slot, the RBs on the OFDM symbols, or QCL relationship.

The QCL relationship includes: QCL between the transmission indication signal and at least one of the following: synchronization signal block (SSB), discovery signal, or CSI-RS.

When the transmission indication signal is transmitted through PDCCH, the configuration information includes at least one of: the monitoring period of the PDCCH, the monitoring duration, slot offset, OFDM symbols in the slot, control resource set (CORESET) on which the transmission indication signal is located, downlink control information (DCI) format, DCI size, aggregation level (AL) of the control channel element (CCE), or the CCE candidate set being monitored.

When the transmission indication signal is sent through DMRS of the PDCCH, the configuration information of the transmission indication signal includes: the CORESET on which the DMRS of the PDCCH is located and/or the time-domain position of the CORESET.

When the transmission indication signal is sent through DMRS of the PDSCH, the configuration information of the transmission indication signal includes: OFDM symbols of the DMRS of the PDSCH and/or the RBs on the OFDM symbols.

When the transmission indication signal is sent through CSI-RS, the configuration information includes at least one of: port number of the CSI-RS, period, the time-domain position on which the transmission indication signal is located, the frequency domain position, density, the code division multiple (CDM) type, power, RBs at the time-domain position, scrambled ID, or transmission configuration Indicator (TCI) state.

When the transmission indication signal is sent through the preset sequence, the configuration information includes at least one of: generation parameters of the preset sequence, period, the time-domain resource, power or transmission resource of the preset sequence.

The generation parameters of preset sequence are related to the time information of the Channel Occupancy Time (COT) of the network device, and the time information includes at least one of: starting time, duration or end time of the COT.

The network device 1100 further includes:

a third sending module, configured to send the downlink physical signal or the downlink physical channel to the terminal, and the downlink physical signal or the downlink physical channel being not overlapped with the transmission resource of the transmission indication signal.

The downlink physical channel includes at least one of: physical broadcast channel (PBCH), PDCCH or PDSCH.

It is worth pointing out that the network device in some embodiments of the present disclosure sends the transmission indication signal to the terminal to indicate the terminal to perform the corresponding terminal behavior according to the terminal behavior indication information, so that unnecessary behavior attempts by the terminal can be avoided, the transmission performance can be improved, and the power consumption of the terminal can be reduced.

It should be noted that, it should be understood that the division of the various modules of the network device and terminal is merely logical function division, and during actual implementation, the various module may be completely or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the determining module may be a separately disposed processing element, or may be integrated into a chip of the apparatus for implementation. In addition, the determining module may also be stored in the memory of the apparatus in the form of program code, and a processing element of the apparatus invokes the program code and performs the functions of the determining module. The implementation of other modules is similar thereto. In addition, all or some of these modules may be integrated together or implemented independently. The processing element herein may be an integrated circuit having a signal processing capability. During implementation, the steps of the method or the modules can be completed by hardware integrated logic circuits in the processor element or indications in the form of software.

For example, the above modules can be configured into one or more integrated circuits to perform the above methods, such as: one or more Application Specific Integrated Circuits (ASIC), one or more digital signal processors (DSP), one or more Field Programmable Gate Arrays (FPGA), or the like. For another example, when one of the above modules is implemented in the form of processing element scheduler code, the processing element can be a general-purpose processor, such as Central Processing Unit (CPU) or other processor that can call the program code. For another example, these modules may be integrated together and implemented in the form of a system-on-a-chip (SOC).

To better achieve the objective, some embodiments of the present disclosure further provide a network device, including: a processor, a memory and a computer program stored in the memory and executable on the processor. When the program is executed by the processor, the steps of the method for transmitting a transmission indication signal are performed.

Some embodiments of the present disclosure further provide a non-transitory computer-readable storage medium, the non-transitory computer-readable storage medium stores a computer program. When the computer program is executed by a processor, the steps of the method for transmitting a transmission indication signal are performed.

Figure 12:
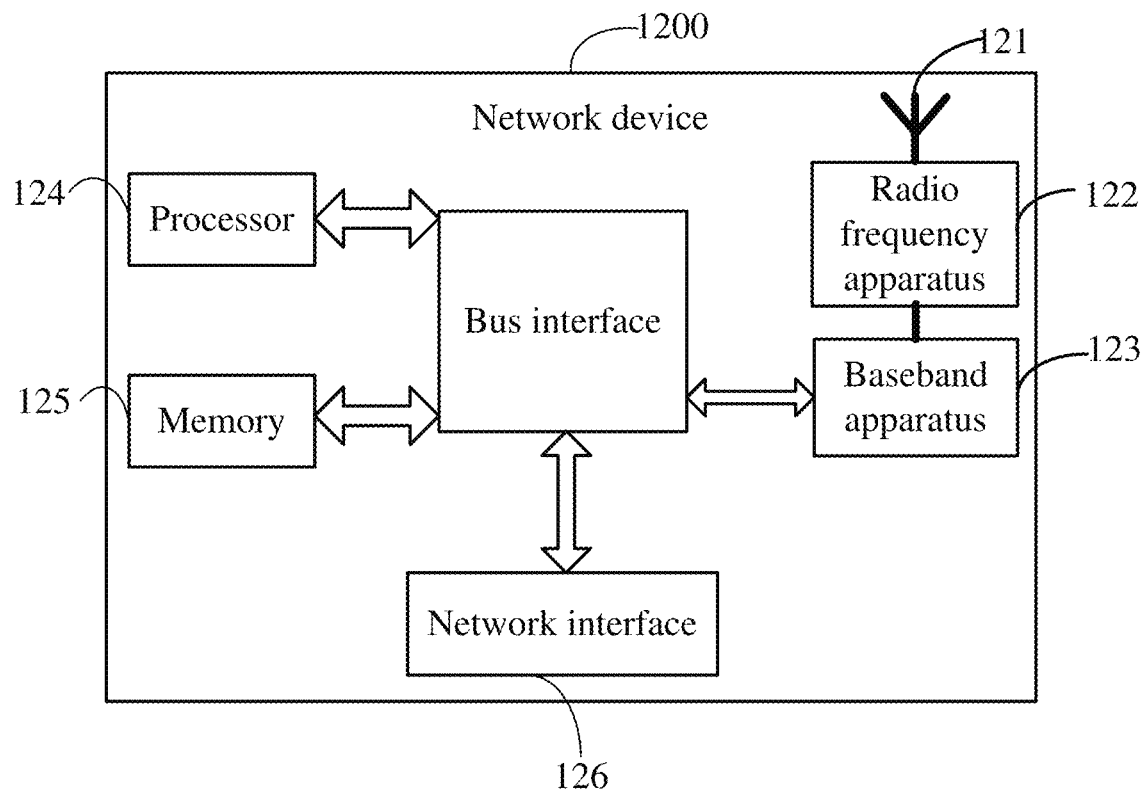
FIG. 12 is a network device block diagram according to some embodiments of the present disclosure.

Some embodiments of the present disclosure further provide a network device. As shown in FIG. 12, the network device 1200 includes: an antenna 121, a radio frequency apparatus 122, and a baseband apparatus 123. The antenna 121 is connected to the radio frequency apparatus 122. In the uplink direction, the radio frequency apparatus 122 receives information through the antenna 121, and sends the received information to the baseband apparatus 123 for processing. In the downlink direction, the baseband apparatus 123 processes information to be sent and sends the information to the radio frequency apparatus 122, and the radio frequency apparatus 122 processes the received information and then sends the information through the antenna 121.

The band processing apparatus may be located in the baseband apparatus 123, and the method performed by the network device in the embodiment may be implemented in the baseband apparatus 123. The baseband apparatus 123 includes a processor 124 and a memory 125.

The baseband apparatus 123 may include, for example, at least one baseband board, and a plurality of chips are arranged on the baseband board. As shown in FIG. 12, one of the chips is, for example, the processor 124, which is connected to the memory 125, to invoke a program in the memory 125, so as to perform the operations of the network device shown in the method embodiment.

The baseband apparatus 123 may further include a network interface 126 for exchanging information with the radio frequency apparatus 122. The interface is, for example, a common public radio indicator (CPRI).

The processor herein may be a single processor, or may be a collective term for a plurality of processing elements. For example, the processor may be a CPU or an ASIC, or may be one or more integrated circuits that are configured to implement the method performed by the network device, for example, may be one or more microprocessors DSPs, or one or more field programmable gate arrays FPGAs. The storage element may be one memory or a collective term for a plurality of storage elements.

The memory 125 may be a volatile memory or a nonvolatile memory, or may include both a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), and is used as an external cache. As exemplary but not limitative descriptions, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and Direct Rambus RAM (DRRAM). The memory 125 described in this application is intended to include but not limited to these and any other suitable types of memories.

The network device in some embodiments of the present disclosure further includes a computer program stored in the memory 125 and executable on the processor 124, and the processor 124 invokes the computer program in the memory 125 to perform the method performed by the modules shown in FIG. 11.

When being invoked by the processor 124, a computer program may be used to: send the transmission indication signal on a part of time-frequency resources being occupied, the transmission indication signal is used to instruct the terminal to perform the corresponding terminal behavior according to the terminal behavior indication information, and the terminal behavior indication information is used to indicate the terminal behavior.

The network device in some embodiments of the present disclosure sends the transmission indication signal to the terminal to indicate the terminal to perform the corresponding terminal behavior according to the terminal behavior indication information, so that unnecessary behavior attempts by the terminal can be avoided, the transmission performance can be improved, and the power consumption of the terminal can be reduced.

Those of ordinary skill in the art can realize that the exemplary units and algorithm steps described with reference to the embodiments disclosed in this specification can be implemented by electronic hardware or a combination of computer software and electronic hardware. Whether these functions are implemented by hardware or software depends on specific applications and design constraints of the technical solutions. A person skilled in the art may use different methods to implement the described functions for each specific application, but such implementation should not be considered as exceeding the scope of the present disclosure.

Those skilled in the art can clearly understand that to describe conveniently and concisely, for a specific working process of the system, apparatus, and unit described above, refer to the corresponding process in the method embodiments. Details are not described herein again.

In the embodiments provided in this application, it should be understood that the disclosed apparatuses and methods may be implemented in other ways. For example, the apparatus embodiments described above are only an example. For example, the division of the units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may be or may not be physically separated, and the components displayed as units may be or may not be physical units, that is, may be located in one place or distributed on multiple network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

If the function is implemented in the form of software function units and sold or used as independent products, the function may be stored in a computer readable storage medium. Based on such an understanding, the technical solutions of the present disclosure essentially, or the part contributing to the related technologies or the part of the technical solution may be implemented in a form of a software product. The computer software product is stored in a storage medium, and includes a plurality of indications for indicating a computer device (which may be a personal computer, a server, a network device, or the like) to perform all or part of the steps of the method described in the embodiments of the present disclosure. The storage medium includes various mediums, such as a USB flash disk, a removable hard disk, a ROM, a RAM, a magnetic disk, or an optical disc, that can store program code.

In addition, it should be noted that in the apparatuses and methods of the present disclosure, it is obvious that the components or the steps may be divided and/or recombined. These divisions and/or recombinations should be considered as equivalent solutions of the present disclosure. Moreover, the steps for performing the series of processing may be performed naturally in chronological order according to a described sequence, but do not necessarily need to be performed in chronological order, and some steps may be performed in parallel or independently. Those of ordinary skill in the art can understand that all or any of the steps or the components of the methods and the apparatuses of the present disclosure may be implemented in any computing apparatus (including a processor, a storage medium, and the like) or a computing apparatus network in the form of hardware, firmware, software, or a combination thereof. Those of ordinary skill in the art can implement this by using their basic programming skills after reading the description of the present disclosure.

Therefore, the objective of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should be further noted that in the apparatuses and methods of the present disclosure, it is obvious that the components or the steps may be divided and/or recombined. These divisions and/or recombinations should be considered as equivalent solutions of the present disclosure. Moreover, the steps for performing the series of processing may be performed naturally in chronological order according to a described sequence, but do not necessarily need to be performed in chronological order, and some steps may be performed in parallel or independently.

Those of ordinary skill in the art can understand that part or all processes of the realization of the method in the embodiments can be implemented by controlling relevant hardware by the computer program. The program is stored on a computer readable storage medium, when the program is executed, the processes of the method in the embodiments can be included. The storage medium can be a magnetic disk, an optical disc, a Read-Only Memory (ROM), a Random Access Memory (RAM) or the like.

The optional implementations of the present disclosure are described above. It should be noted that persons of ordinary skill in the art may further make several improvements and refinements without departing from the principles described in the present disclosure, and these improvements and refinements also fall within the protection scope of the present disclosure.

The invention claimed is:

1. A method for receiving a transmission indication signal, applied to a side of a terminal, the method comprising:
   receiving the transmission indication signal on a part of time-frequency resources occupied by a network device, wherein the time-frequency resources occupied by the network device are unlicensed band resources, the transmission indication signal is used to instruct the terminal to perform a corresponding terminal behavior according to terminal behavior indication information, the terminal behavior indication information is pre-allocated to the terminal by the network device, the terminal behavior indication information is used to indicate the terminal behavior, and the terminal behavior indication information is used to instruct the terminal to perform beam failure detection;
wherein the transmission indication signal is transmitted in a form of a preset sequence, wherein the preset sequence comprises at least one of: a ZC sequence, a Gold sequence or an m sequence; and
wherein the preset sequence is transmitted periodically and repeatedly in a time direction, and the preset sequence is mapped according to an order of a frequency direction first and then the time direction.

2. The method for receiving the transmission indication signal according to claim 1, wherein the terminal behavior indication information is transmitted by the network device through high-layer signaling or medium access control (MAC) control element (CE), and the terminal behavior indication information is further used to instruct the terminal to perform at least one of following behaviors:
monitoring a physical downlink control channel (PDCCH);
channel state information (CSI) measurement;
radio resource management (RRM) measurement;
beam management measurement; or
radio link monitoring.

3. The method for receiving the transmission indication signal according to claim 1, wherein after receiving the transmission indication signal on the part of the time-frequency resources occupied by the network device, the method further comprises:
receiving a downlink physical signal or a downlink physical channel, the downlink physical signal or the downlink physical channel being not overlapped with a transmission resource of the transmission indication signal.

4. The method for receiving the transmission indication signal according to claim 1, wherein the transmission indication signal is further transmitted in one of following forms:
a physical downlink control channel (PDCCH);
a demodulation reference signal (DMRS) of the PDCCH;
a DMRS of a physical downlink share channel (PDSCH); or
a channel state information reference signal (CSI-RS).

5. The method for receiving the transmission indication signal according to claim 4, wherein the transmission indication signal is transmitted in the DMRS of the PDCCH, and the DMRS of the PDCCH is a bandwidth DMRS.

6. The method for receiving the transmission indication signal according to claim 5, wherein the bandwidth DMRS is mapped on a resource element group (REG) of contiguous resource blocks (RBs) in a control resource set (CORESET), and precoder granularity of the CORESET is the same as an amount of RBs contained in the CORESET.

7. The method for receiving a transmission indication signal according to claim 4, wherein before receiving the transmission indication signal on the part of the time-frequency resources occupied by the network device, the method further comprises:
receiving configuration information of the transmission indication signal.

8. The method for receiving the transmission indication signal according to claim 7, wherein the configuration information comprises at least one of: a transmission period of the transmission indication signal, a slot in which the transmission indication signal is located, orthogonal frequency division multiplexing (OFDM) symbol positions in the slot, a quantity of OFDM symbols in the slot, resource blocks (RBs) on the OFDM symbols, and quasi co-location (QCL) relationship.

9. The method for receiving the transmission indication signal according to claim 8, wherein the configuration information comprises the QCL relationship, the QCL relationship comprises: QCL between the transmission indication signal and at least one of: synchronization signal block (SSB), discovery signal, or channel state information reference signal (CSI-RS).

10. The method for receiving the transmission indication signal according to claim 7, wherein when the transmission indication signal is further transmitted through the PDCCH, the configuration information comprises at least one of: a monitoring period of the PDCCH, monitoring duration, slot offset, OFDM symbols in the slot, a control resource set (CORESET) on which the transmission indication signal is located, downlink control information (DCI) format, DCI size, an aggregation level (AL) of control channel element (CCE), and a CCE candidate set being monitored.

11. The method for receiving the transmission indication signal according to claim 7, wherein when the transmission indication signal is further transmitted through the DMRS of the PDCCH, the configuration information comprises: at least one of a control resource set (CORESET) on which the DMRS of the PDCCH is located, or a time-domain position of the CORESET; or
when the transmission indication signal is further transmitted through the DMRS of the PDSCH, the configuration information comprises: at least one of OFDM symbols of the DMRS of the PDSCH or resource blocks (RBs) on the OFDM symbols; or
when the transmission indication signal is further transmitted through the CSI-RS, the configuration information comprises at least one of: port number of the CSI-RS, a periodicity of the CSI-RS, a time-domain position of the CSI-RS, a frequency domain position of the CSI-RS, density, a code division multiple (CDM) type, power, RBs at the time-domain position of the CSI-RS, scrambled identifier (ID), and transmission configuration indicator (TCI) state; or
when the transmission indication signal is transmitted through the preset sequence, the configuration information comprises at least one of: generation parameters of the preset sequence, periodicity, time-domain resource, power, and transmission resource of the preset sequence.

12. The method for receiving the transmission indication signal according to claim 11, wherein the configuration information comprises the generation parameters of the preset sequence, the generation parameters of the preset sequence are related to time information of a channel occupancy time (COT) of the network device, and the time information comprises at least one of: a starting time of the COT, a duration of the COT, or an end time of the COT.

13. A terminal, comprising:
a processor configured to receive a transmission indication signal on a part of time-frequency resources occupied by a network device, wherein the time-frequency resources occupied by the network device are unlicensed band resources, the transmission indication signal is used to instruct the terminal to perform a corresponding terminal behavior according to terminal behavior indication information, the terminal behavior indication information is pre-allocated to the terminal by the network device, the terminal behavior indication information is used to indicate the terminal behavior, and the terminal behavior indication information is used to instruct the terminal to perform beam failure detection;

wherein the transmission indication signal is transmitted in a form of a preset sequence, wherein the preset sequence comprises at least one of: a ZC sequence, a Gold sequence or an m sequence; and wherein the preset sequence is transmitted periodically and repeatedly in a time direction, and the preset sequence is mapped according to an order of a frequency direction first and then the time direction.

14. A method for transmitting a transmission indication signal, applied to a side of a network device, the method comprising:

sending the transmission indication signal on a part of time-frequency resources being occupied, wherein the time-frequency resources occupied by the network device are unlicensed band resources, the transmission indication signal is used to instruct a terminal to perform a corresponding terminal behavior according to terminal behavior indication information, the terminal behavior indication information is pre-allocated to the terminal by the network device, the terminal behavior indication information is used to indicate the terminal behavior, and the terminal behavior indication information is used to instruct the terminal to perform beam failure detection;

wherein the transmission indication signal is sent in a form of a preset sequence, wherein the preset sequence comprises at least one of: a ZC sequence, a Gold sequence or an m sequence; and wherein the preset sequence is transmitted periodically and repeatedly in a time direction, and the preset sequence is mapped according to an order of a frequency direction first and then the time direction.

15. The method for transmitting the transmission indication signal according to claim 14, wherein after sending the transmission indication signal on the part of the time-frequency resources being occupied, the method further comprises:

sending a downlink physical signal or a downlink physical channel to the terminal, the downlink physical signal or the downlink physical channel being not overlapped with a transmission resource of the transmission indication signal.

16. The method for transmitting the transmission indication signal according to claim 14, wherein the transmission indication signal is further sent in one of the following forms:

a physical downlink control channel (PDCCH);
a demodulation reference signal (DMRS) of the PDCCH;
a DMRS of a physical downlink share channel (PDSCH); or
a channel state information reference signal (CSI-RS).

17. A network device comprising: a processor, a memory, and a computer program stored in the memory and executable on the processor, wherein when the computer program is executed by the processor, the computer program causes the network device to perform steps of the method for transmitting the transmission indication signal according to claim 14.

18. A non-transitory computer-readable storage medium, wherein the non-transitory computer-readable storage medium stores a computer program, when the computer program is executed by a processor of a terminal, the computer program causes the terminal to perform steps of the method for transmitting the transmission indication signal according to claim 1.

19. A non-transitory computer-readable storage medium, wherein the non-transitory computer-readable storage medium stores a computer program, when the computer program is executed by a processor of a network device, the computer program causes the network device to perform steps of the method for transmitting the transmission indication signal according to claim 14.

20. The terminal according to claim 13, wherein the processor is further configured to: receive a downlink physical signal or a downlink physical channel; and the downlink physical signal or the downlink physical channel is not overlapped with a transmission resource of the transmission indication signal.

* * * * *